(12) United States Patent
Fritjofsson

(10) Patent No.: US 8,746,040 B2
(45) Date of Patent: Jun. 10, 2014

(54) DEVICE FOR TIGHTNESS CONTROL AND MARKING OF HOLES AND/OR OTHER DAMAGES ON HOSE, AND OPTIONAL AUTOMATIC DETECTION OF HOLES

(75) Inventor: Per-Arne Fritjofsson, Uppsala (SE)

(73) Assignee: Allgotech AB, Uppsala (SE)

( * ) Notice: Subject to any disclaimer, the term of this patent is extended or adjusted under 35 U.S.C. 154(b) by 0 days.

(21) Appl. No.: 13/500,489

(22) PCT Filed: Oct. 5, 2010

(86) PCT No.: PCT/SE2010/051072
§ 371 (c)(1),
(2), (4) Date: Apr. 5, 2012

(87) PCT Pub. No.: WO2011/043723
PCT Pub. Date: Apr. 14, 2011

(65) Prior Publication Data
US 2012/0266661 A1    Oct. 25, 2012

(30) Foreign Application Priority Data
Oct. 7, 2009   (SE) ...................................... 0950737

(51) Int. Cl.
G01M 3/02    (2006.01)
G01M 3/04    (2006.01)
B65H 54/40   (2006.01)

(52) U.S. Cl.
CPC ...................................... *G01M 3/04* (2013.01)
USPC .......................... 73/40.5 R; 73/49.1; 73/865.8

(58) Field of Classification Search
USPC .................. 73/40, 40.5 A, 49.1, 431.1, 865.8
See application file for complete search history.

(56) References Cited

U.S. PATENT DOCUMENTS

| | | | | |
|---|---|---|---|---|
| 3,299,417 A | * | 1/1967 | Sibthorpe | 340/605 |
| 3,721,898 A | * | 3/1973 | Dragoumis et al. | 324/693 |
| 3,756,072 A | * | 9/1973 | MacMurray | 73/40.5 R |
| 4,576,037 A | * | 3/1986 | Cox | 73/40.5 R |
| 4,649,948 A | * | 3/1987 | Hudson | 137/15.11 |

(Continued)

FOREIGN PATENT DOCUMENTS

| | | |
|---|---|---|
| DE | 102 25 696 | 12/2002 |
| DE | 101 29 481 | 1/2003 |

(Continued)

OTHER PUBLICATIONS

English Translation of EP 0677728.*

(Continued)

*Primary Examiner* — Hezron E Williams
*Assistant Examiner* — Alexander Mercado
(74) *Attorney, Agent, or Firm* — Nixon & Vanderhye P.C.

(57) ABSTRACT

In a test pressurizing system for a hose such as fire hose, a device is arranged for bearing of a pressurized hose in a way that it is surrounded by protective wall parts. Further, a mechanism is provided on the inside of the wall parts for marking of holes and/or other damages that can be maneuvered automatically or manually via the operator so that at least some protective wall part protects the operator under pressurization. The marking device may be combined with a device for automatic detection of holes and damages. This can for example admit marking of the hose with high precision, and/or be part of a fully automated solution for detection and marking of holes in the hose.

13 Claims, 4 Drawing Sheets

(56) References Cited

U.S. PATENT DOCUMENTS

| | | | |
|---|---|---|---|
| 6,330,483 B1 | 12/2001 | Dailey | |
| 6,351,985 B1 * | 3/2002 | Bedwell | 73/49.8 |
| 8,176,771 B2 * | 5/2012 | Onishi et al. | 73/45.5 |
| 2003/0200877 A1 | 10/2003 | Blei | |
| 2003/0201211 A1 | 10/2003 | Bennett et al. | |
| 2005/0166666 A1 * | 8/2005 | Tsukagoshi | 73/49.1 |
| 2008/0201974 A1 * | 8/2008 | Kato | 33/551 |
| 2009/0248324 A1 * | 10/2009 | Hamilton et al. | 702/47 |

FOREIGN PATENT DOCUMENTS

| | | |
|---|---|---|
| DE | 202005008846 | 9/2005 |
| DE | 198 16 105 | 11/2006 |
| DE | 199 16 976 | 2/2008 |
| DE | 10 2007 012 147 | 9/2008 |
| EP | 0 677 728 A2 | 10/1995 |
| EP | 06 77 728 | 10/1995 |
| JP | 02122233 A * | 5/1990 ... G01M 3/20 |
| SE | 528 582 C2 | 12/2006 |
| SE | 528582 | 12/2006 |
| WO | WO 2008/110150 | 9/2008 |
| WO | WO 2011006867 | 1/2011 |

OTHER PUBLICATIONS

K.J. Åström et al., "Computer Controlled Systems, Theory and Design", 3rd Ed, Prentice Hall, 1997.

J. Maciejowski, Multivariable Feedback Design, Addison-Wesley 1989.

* cited by examiner

DEVICE FOR TIGHTNESS CONTROL AND MARKING OF HOLES AND/OR OTHER DAMAGES ON HOSE, AND OPTIONAL AUTOMATIC DETECTION OF HOLES

This application is the U.S. national phase of International Application No. PCT/SE2010/051072, filed 5 Oct. 2010, which designated the U.S. and claims priority to SE Application No. 0950737-7, filed 7 Oct. 2009, the entire contents of each of which are hereby incorporated by reference.

TECHNICAL FIELD

The invention concerns control or inspection of a hose, and relates to a device for tightness control and marking of possible damages on the hose.

BACKGROUND

Hoses, like for example fire hoses, are usually controlled or inspected after usage to, among other things, control the tightness of the hose. This is normally done by connecting one end of the hose to a so-called air valve and the other end to a liquid pump (usually a water pump) that can fill the hose with pressurized fluid (e.g. water). The air inside the hose can then abscond through the air valve which lets air and gas through but not water.

The liquid-filled hose can then be inspected, usually wound up in screw line form on a drum with a preferably vertical oriented axle that allows winding-up of the hose within a relatively small space. There also exists other ways of winding-up a hose.

Another type of testing system is known from WO 2008/110150 A1.

The hose can burst during pressurization, at which the operator risks being injured during visual inspection. The liquid pressure can be very high, at which the operator can receive injury by leaking jets. It is well-known to encapsulate the pressurized winding-up of the hose with a screen or similar protection device which protects the operator at inspection/control of the hose.

The European patent EP 0 677 728 shows, for example, a solution where a transparent protective screen fully encapsulates the drum on which the hose is wound-up to ease visual inspection while providing a certain protection. The screen is further provided with openable hatches which makes it possible for the operator to get to the pressurized hose through the screen, for example to mark possible holes in the hose so that a later repairing can take place. In this known case, the drum is held still under pressurization due to the other end of the hose being connected to a stationary water supply connection. Thus the operator must move around the drum during visual inspection.

In other known cases, like for example in the Swedish patent SE 528 582, the pressurized and on the drum wound-up hose is connected to the water pump via a pipe swivel connection that allows a free rotation of the drum while the hose is maintained pressurized. In that manner, the operator can remain in a fixed operator position at the visual inspection, and the protective barrier between the operator and the drum can have a lesser extent in the drums circumference direction. According to the Swedish patent SE 528 582, the protective barrier can with benefit be designed like a transportable screen that can be removed if needed or set in an optional position relative to the construction.

When a hole or other damage is detected during inspection according to known technique, the hole or other damage on the hose should be marked. In the known cases, the operator opens one or more hatches in an encapsulated screen, alternatively removes a smaller screen or uses an opening at the side of such a screen, to get to the pressurized hose so that the damage can be marked.

It is well known that the hose can rift or burst under pressurization, and there is then a big risk that an operator who is controlling the hose's tightness can be seriously injured. The previously known solutions have tried to find solutions to this problem during the visual inspection. However the problem remains and as do the serious risks with the hose bursting during marking of damages on the hose when the operator opens hatches or in another way seek access to the pressurized hose to be able to mark where holes and similar damages are on the hose. In the light of the high pressure that is often used at pressurizing of e.g. a fire hose, there are big risks to open a hatch and insert in an arm at the marking of holes if the hose rifts. Furthermore the operator can also be injured by out leaking jets from the holes that shall be marked (without the hose for that sake has rifted) and the operator can of course also get wet.

SUMMARY

The invention seeks at least partially but preferably completely to eliminate the risk of injury for the operator at the marking of holes or other damage on the hose.

A general object is to provide an improved device for controlling/inspection of hose.

According to the invention this can be accomplished by an elegant solution where the hose bearing drum for the bearing of pressurized hose is surrounded by protective wall parts, and there is provided a mechanism, arranged on the inside of the wall parts, for marking of holes and/or other damages that can be maneuvered automatically or manually via the operator so that at least some protective wall part always protects the operator when the hose is under pressurization.

Preferably there is no need for any body part of the operator to be on the inside of the protective wall parts.

In that way a built-in mechanism for marking of holes and/or other damage on hose is enabled.

The maneuvering of the marking device can for example occur more or less automatically through computer control with usage of a suitable user interface (e.g. keyboard, touch screen, computer mouse and/or electronic control stick) for the operator, or manually via the operator which through a suitable maneuvering device then can steer and control the marking device.

According to another aspect, the invention provides a test pressurization system for fire hose including such a device for controlling/inspection of hose.

According to yet another aspect there is provided a combined system for washing and pressurizing hose including such a device for controlling/inspection of hose.

DETAILED DESCRIPTION

Figure 1:
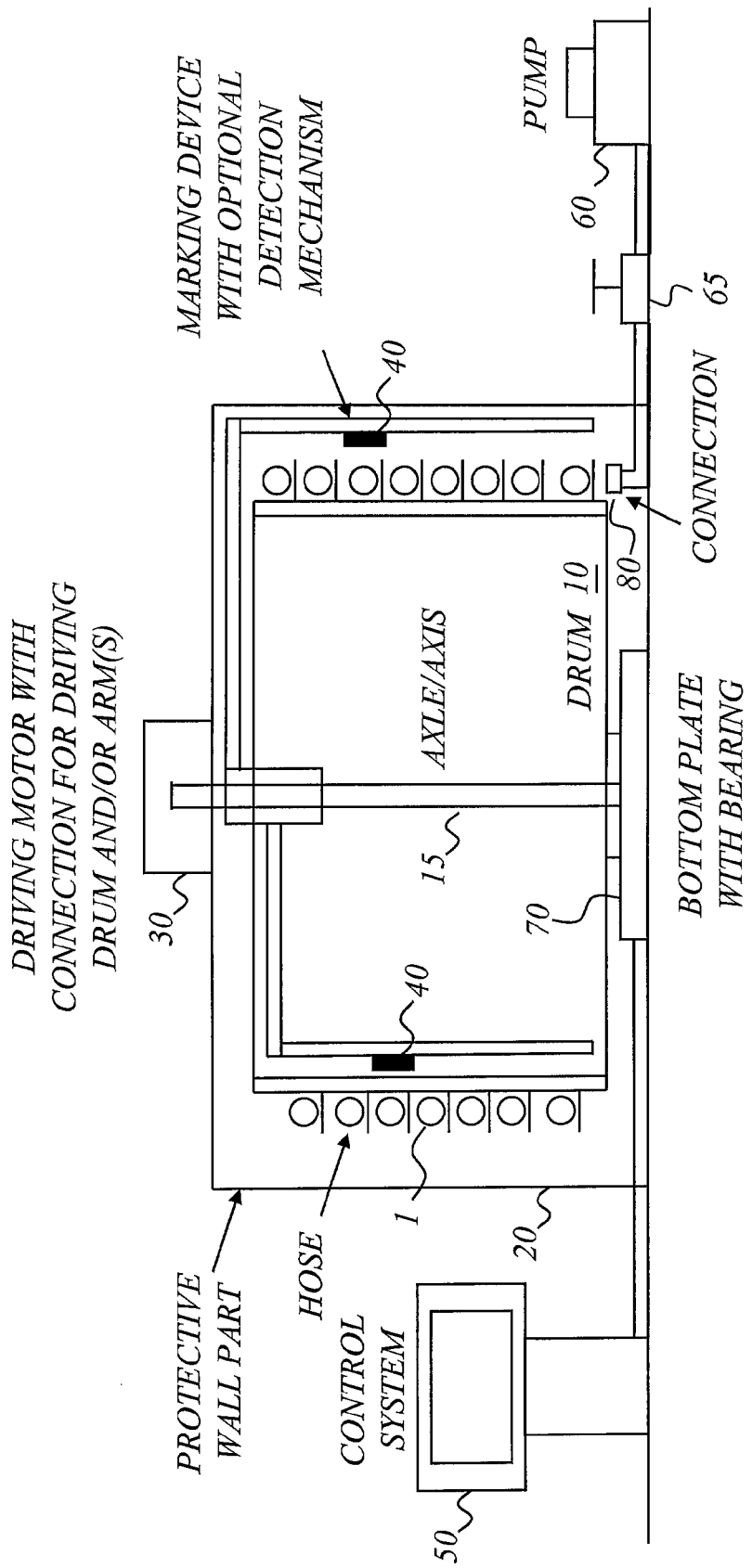
FIG. 1 is an illustrative cross section figure of an example of a device for control of a hose.

The invention is described through illustrative examples that illustrate the fundamental principles.

It may be useful to start with a general description of the basic design of the invention.

The invention provides a device for controlling or inspection of a hose including a hose-bearing drum for bearing of pressurized hose wherein this hose-bearing drum for bearing of pressurized hose is surrounded by protective wall parts, and a mechanism, arranged on the inside of the wall parts, for marking of holes and/or other damages that can be maneuvered automatically or manually via an operator so that at least some protective wall part always protects the operator under pressurization.

For example, the hose-bearing drum for bearing of pressurized hose is built-in into a closed system, where the mechanism for marking of holes and/or other damages also is arranged on the inside of the protective walls. In other words, the mechanism for marking of holes and/or other damages on the hose is built-in into the closed system.

In a particular example, the hose-bearing drum is a winding-up drum that is arranged to admit a screw line formed winding-up of the hose.

There may also be provided a driving motor for rotational driving of the drum to obtain motorized winding-up of the hose.

In a specific example, the hose bearing drum is arranged to stand still during pressurization, and the marking device is arranged so that it is turnable around the hose bearing drum for marking of holes and/or other damages.

For example, one may then use a turnable structure with a radially directed bearing arm to which an angular arm is connected, wherein a marking device is arranged on the angular arm and the turnable structure is arranged inside and/or outside of the hose bearing drum for marking of holes and/or other damages on the hose.

The angular arm may for example be designed like a running rail, and the marking device is arranged like a runner which can move in a direction parallel to the extension of the axis of the drum to admit marking of holes or other damages on the winded-up hose.

It is possible to use a system for maneuvering the marking device through computer control of the motor or motors that is/are arranged in the system for rotation and/or translation.

Preferably, a user interface can be provided for admitting the operator to control this computer control.

In another example, a control (steering) stick or similar is arranged to enable the operator to maneuver the marking device to an intended position for marking of holes or other damages.

In another specific example, the device is configured to admit pressurized liquid feeding to be maintained during rotation of the hose bearing drum, and the marking device is arranged on a rail inside of the protective walls.

The rail may for example extend substantially parallel to the rotational axis of the drum but outside of the drums perimeter, and the position of the marking device can be controlled as a runner along the rail.

By way of example, one may provide an externally arranged mechanical control stick which through a protective housing is connected to the moveable marking device to admit controlling of the position along the rail and the activation of the marking process of holes in the hose manually, or a system for computerized control via a user interface.

The device may also include a detection mechanism for automatic detection of holes or other damages. For example, one may provide a system for controlling the movements of the detection mechanism so that a systematic inspection of substantially the whole hose is admitted, manually or through programming of a movement pattern via driving motors.

In a particular example, there is provided a fully automated system for detection and marking of holes where the computerized control uses input data from the detection mechanism so that marking can be performed in association with a detected hole.

The invention is for example applicable to a test pressurization system for fire hoses and/or to a combined system for washing and pressurizing hose, and may thus be integrated into such a system.

The invention will now be described with reference to illustrative examples, referring to FIGS. 1-4.

For example the invention is applicable on devices for tightness control where the device for bearing of hose (e.g. a hose bearing drum) is standing still under pressurization, and where one can preferably arrange the marking device so that it is turnable around the hose bearing device (e.g. a drum) for marking of holes and/or other damages.

The invention is however also applicable on devices for tightness control where pressurized liquid feeding can be maintained under rotation of the hose bearing device (e.g. a drum), and where the marking device can be arranged on a rail or arm which is in a more or less fixed position inside of the protective walls, preferably in connection with a fixed operator position.

The device for marking can for example be constituted by a ink jet writing unit or be realized through other conventional marking technique.

Depending on the choice of implementation one can arrange the marking device so that translation in different directions is admitted, e.g. changing of position vertically and/or changing of position horizontally, also in combination with possible rotation of the marking device. Different examples of implementations will be described below.

One can also combine the built-in marking device with a device for automatic detection of holes and damages, based on for example visual indications (e.g. camera), pressure changes (e.g. pressure sensor) and/or detection of sound (e.g. microphone). For example, a camera unit or similar device can be used together with a data processing unit for visual detection of leaking water/fluid from a hole in the hose (alternatively detection of leaking gas in a fluid). Alternatively, it is possible to use a pressure sensor or similar device for detecting a change in pressure in the hose at leakage or for detecting the beam of water/fluid that occurs due to a hole or other damage in the hose. Yet another variant is to use a microphone together with a data processing unit for detecting sound that comes from water/fluid leaking out from a hole in the hose.

This can for example admit marking with high precision, and/or be part of a fully automated solution for detection and marking of holes. It should be understood that the automatic detection mechanism may be integrated with the marking device, or alternatively provided as a separate unit that can be controlled and maneuvered independently of the marking device.

In a preferred group of solutions, the parts for bearing (and pressurizing) of hose is part of a closed system to ensure a complete protection of the operator at possible hose explosion. The marking device is then preferably fully built into the closed system.

FIG. 1 is an illustrative cross section figure of an example of a device for control of hose that shows two different alternatives for placement of a mechanism for marking of holes and/or other damages on the hose.

The overall device for control or inspection of hose e.g. fire hose, is in this example built on the basis of a conventional drum 10 for winding up hose which is further arranged to admit screw line formed winding-up of the hose 1. The drum 10 stands for example on a bottom plate 70 which bears a bearing with which the drums centre is upheld for rotation around the drums axis 15. A driving motor 30 can possibly be supplied for the rotation of the drum. Alternatively the drum is turned or rotated manually, e.g. in connection with the winding-up of the hose.

Preferably the drums axis 15 is vertically oriented as shown in FIG. 1, implementations with a horizontally lying axis may also be used.

The device normally includes a water pump 60, or corresponding pressurized water source, here schematically illustrated with an associated closing valve 65, which via suitable connection 80 can be connected to the hose 1. The connection to the hose can for example be made in a fixed position somewhere at the drum's peripheral parts, or alternatively via a swivel connection arranged at the axis of the drum and an associated pipe section that runs up through the drum's centre. Additional examples of connection to the hose exist. In general a fluid connection is used which can be connected to a corresponding connection on the one end of the hose. The other end of the hose typically bears a coupling which admits connection to an air valve.

The water pump 60 and associated peripheral equipment can in one example be arranged in a separate space, e.g. in another room or another floor plane (like a basement), with a suitable connection to the other parts of the test pressurizing system.

The device for controlling or inspection of hose can for example be a so-called test pressurizing system for a fire hose or a combined system for both hose wash and test pressurization. The system can in principle be controlled manually by the operator via different mechanical control principles, but in general a computerized control system 50 may be used for the control of different functions like motorized winding-up, pressurizing, possibly automated detection of holes in the hose and/or marking of such holes, and possibly other optional functions that are offered.

When the hose 1 is filled with pressurized fluid (e.g. water) the air in the hose can leave through the air valve that lets through air and gas but not water. Under the pressurization the hose can be inspected either manually or mechanically via different types of sensors, which will be described in more detail later. When a hole or other damage in the hose is found the hole should be marked so that subsequent reparation can be performed. According to a known technique this is done by the operator via openable hatches, but this means a big risk for serious accidents if the hose should burst under the high pressure.

In this example the drum is built for bearing of the pressurized hose in a more or less closed system with surrounding protective walls 20 to ensure a high degree of safety for the operator. Instead of supplying operator inspection hatches so that the operator can reach in and mark holes by hand, it is supplied, a mechanism 40, arranged on the inside of the walls, for marking of holes and/or other damages that can be maneuvered automatically or manually via the operator so that at least some protective wall or part of a wall always protects the operator during pressurization.

If the drum 10 is arranged to stand still during pressurization one can preferably arrange the marking device 40 so that it is turnable around the drum. As illustrated in FIG. 1 one can use a turnable or rotational structure with a radially directed bearing arm to which an angular arm (essentially parallel to the rotation axis) is attached. On the angular arm that for example can be designed as a running rail an ink jet writing mechanism or similar, can be arranged. Preferably the marking device is arranged like a runner that can be moved in a direction parallel with the extension of the drums axis (usually vertically) to admit marking of holes or other damages on the hose winded up on the drum. Such a turnable or rotational structure for marking can be arranged inside and/or outside of the drum (but inside of the protective walls) as shown in FIG. 1. If one does not want to turn or rotate the bearing arm manually, one can use a driving motor for that purpose.

It is also possible to use a device for automatic detection of holes and damages, based on for example visual indications (e.g. camera), pressure changes (e.g. pressure sensor) and/or detection of sound (e.g. microphone). One can thus use e.g. a camera unit or similar which together with a data processing unit admits visual detection of squirting water/fluid from leakages in the hose. Alternatively one can use a pressure sensor or a similar unit that senses the jet that occurs from leakage due to a hole or other damage in the hose. An additional variant is thus to use a microphone that together with associated data processing unit registers and detects sound that occurs in relation to the water or fluid leaking out.

This can for example admit marking with high precision, and/or be part of a fully automated solution for detection and marking of holes. In one example such a detection mechanism is with advantage arranged on the same arm as the marking mechanism. Preferably one will control the detection mechanisms movement (through rotation and/or translation) so that systematic inspection of essentially the whole hose is admitted. This can be done manually, or through programming of a movement pattern via the driving motors.

In such a more or less automated solution for detection of holes the need also reduces for transparent wall parts. Also the need for lighting inside the protective walls is reduced.

It should however be noted that it is fully possible to use the marking device according to the invention together with a by the operator manually performed inspection of the hose. If it is about a usual visual inspection one usually makes use of one or more transparent wall parts, e.g. some form of reinforced protective glass.

Figure 2:
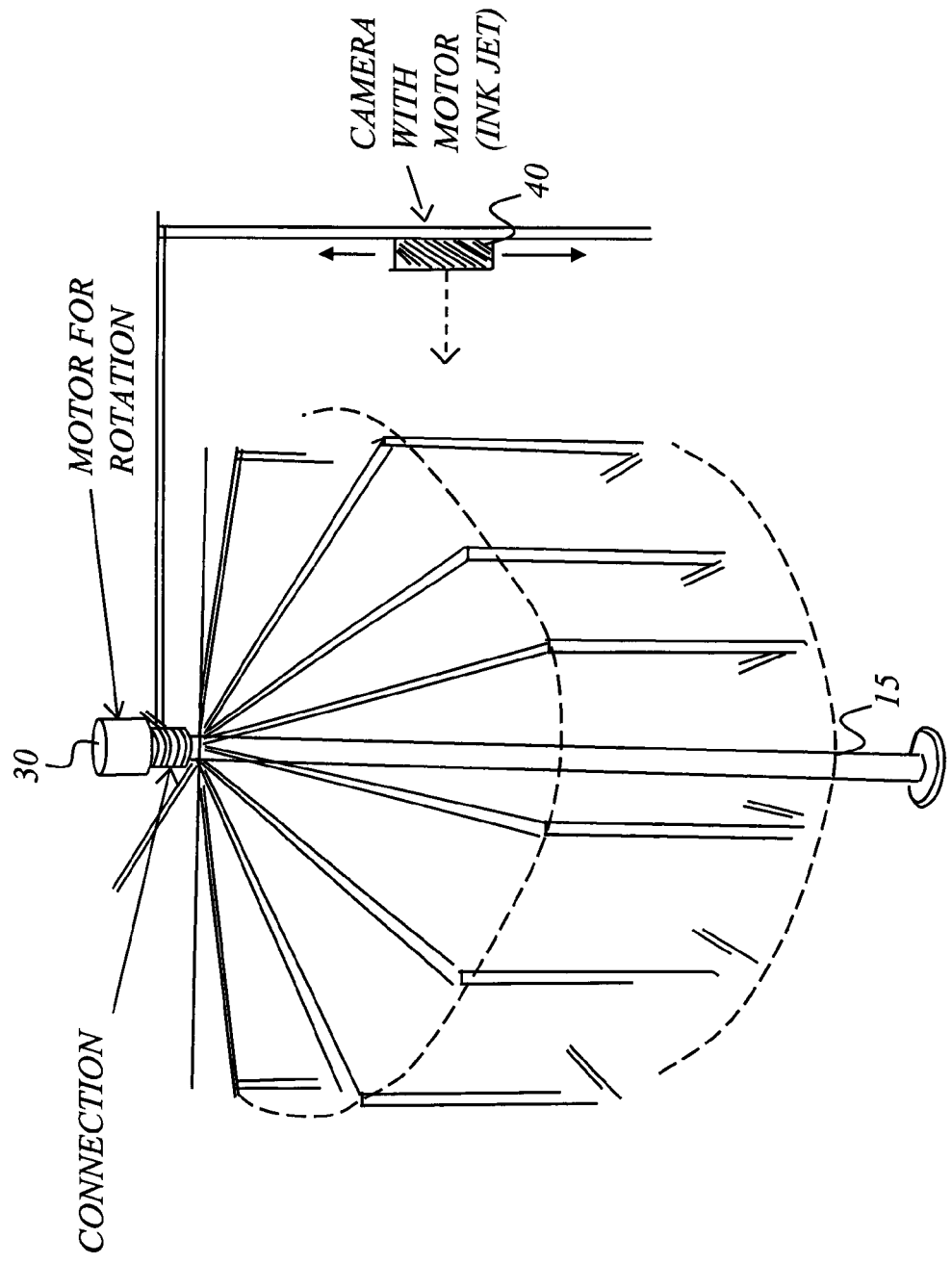
FIG. 2 shows an example of a marking device for a device for controlling a hose in another perspective.

FIG. 2 shows an example of a marking device 40 for a device for controlling hose in another perspective. Here the winding-up mechanism is just illustrated schematically, but one can clearly see that the marking device 40 in this example is arranged just outside the winding-up mechanism's perimeter, and that a rotational connection and possible motor 30 can be used to admit rotation of the system of arms that bears the marking device 40 (e.g. ink jet writing mechanism) and possible device (e.g. camera) for detection of holes and/or other damages. The marking device 40 and the possible device for detection of holes is preferably arranged as a runner on a running rail that can be moved in a direction parallel to the extension of the drums axis (usually vertically) along the with the to the axis parallel bearing arm (the running rail), e.g. with the help of another driving motor. In such a way the marking device and the possible device for detection of holes can be controlled to different positions to mark holes on the wound up hose.

Maneuvering of the marking device is done by for example computer control of the motor or motors that are arranged in the system for rotation and/or translation. A suitable user interface admits the operator the control over the computer-controlled motors. If a fully automated system for detection and marking of holes is desired the computer control uses input data from the detection device so that marking can take place in association to a detected hole. If the marking device is used together with manual inspection of the hose, a control stick or similar can be provided to allow for the operator to control the marking device to the intended position and thereafter perform the marking of the hole.

Figure 3:
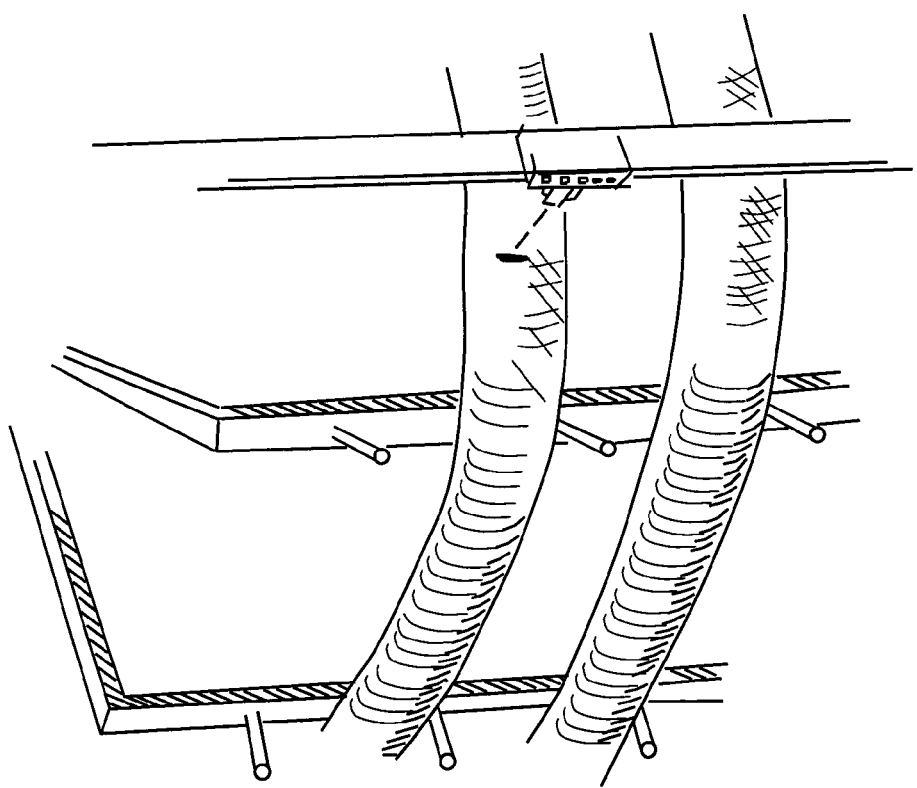
FIG. 3 shows yet another view of an example of a marking device together with part of a wound-up hose.

FIG. 3 shows yet another view of an example of a marking device together with part of the wound-up hose. In this particular example one can see that the drum shows winding-up support that have winding-up holders or similar contact surface to admit winding-up of the hose in different levels.

Figure 4:
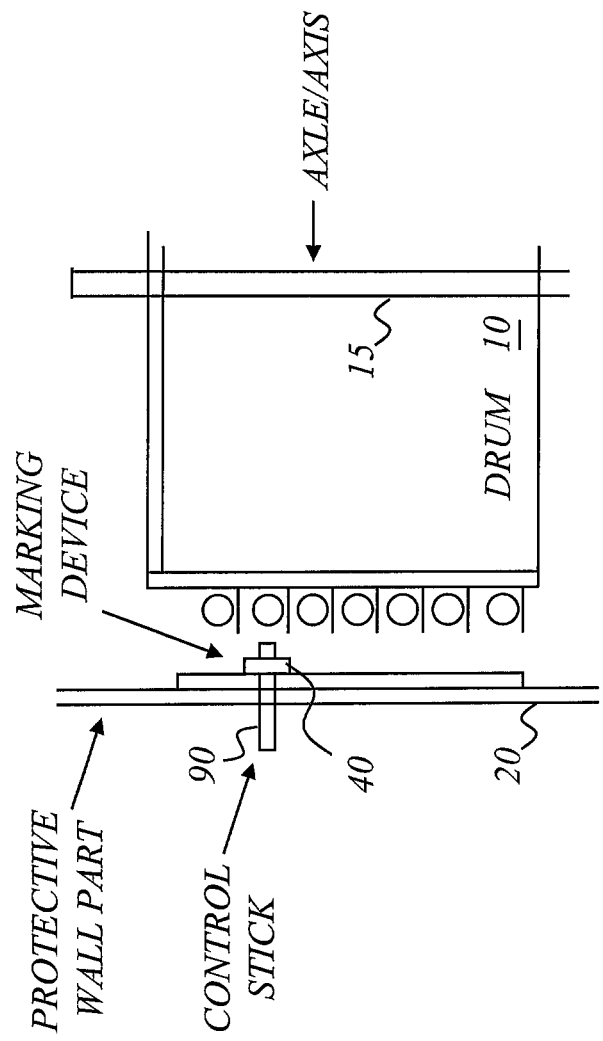
FIG. 4 shows an example where the marking device is arranged on a rail which reaches primarily parallel to the drum's rotational axis but outside the drum's perimeter.

The invention is also applicable on devices for tightness control where pressurized fluid feeding can be maintained under rotation of the drum. In an illustrative example the marking device can be arranged on a rail or arm that is in a more or less fixed position inside of the protective walls, preferably in connection to a fixed operator position intended for inspection and/or controlling of the device. As shown in the example according to FIG. 4 the marking device 40 can be arranged on a rail which reaches primarily parallel to the drum's rotational axis 15 but outside the drum's perimeter. This example admits the possibility to control the marking device's position as a runner along the rail (usually vertically if the drums rotational axis and the rail is vertically arranged). Without having to open any hatch and enter with any body part in to the more or less closed system (of which only part is shown in FIG. 4) on can for example control the position along the rail and the activation of the marking of holes on the hose manually by hand through an externally arranged mechanical control stick 90 which through the protective covering 20 is connected to the moveable marking device 40. One can also imagine a computerized control of these functions via a suitable user interface.

In a different variant, the parts for bearing of the hose and winding-up of the hose are designed in one single plane, preferably around an axis. The marking device can then be arranged on an arm which is turnable or rotatable around this axis, and can further be arranged running along a running rail on the arm. In this example it is only necessary for one bearing arm that is essentially orthogonal against the rotational axis to be admitted.

For example one can wind-up the hose in spiral- or shell form on one level around a vertically oriented axis, and arrange an overlying arm for rotation or turning around this axis, where the marking and/or detection equipment can run along a running rail on the arm so that one can reach the hose's different parts through rotation of the arm and translation of marking and/or detection equipment along the arm for marking and/or detection of holes and damages.

In an alternative solution the rotational axis is horizontally oriented e.g. for hanging of the test pressuring system on a wall.

Even if the invention essentially has been described with reference to a winding-up drum, it is clear that the invention can be used for other types of arrangements and structures for bearing of the hose.

The above described embodiments are only examples and the invention is not limited to these. Further modifications, changes and improvements that build on the fundamental principles that are shown here lies within the scope of the invention.

The invention claimed is:

1. A device for controlling a hose comprising:
   a hose-bearing drum for bearing the hose and surrounded by protective wall parts,
   a mechanism, arranged on the inside of the wall parts, for marking of holes or other damages that is capable of being maneuvered automatically or manually via an operator so that at least some protective wall part always protects the operator under pressurization of the hose; and
   a turnable structure with a radially directed bearing arm to which an angular arm is connected,
   wherein a marking device is arranged on the angular arm and the turnable structure is arranged inside or outside of the hose bearing drum for marking of holes or other damages on the hose.

2. The device for controlling a hose according to claim 1, wherein the angular arm is designed as a running rail, and the marking device is arranged as a runner which can move in a direction parallel to the extension of the axis of the drum to admit marking of holes or other damages on the hose.

3. The device for controlling a hose according to claim 1, further comprising a computer configured to maneuver the marking device using a motor or motors.

4. The device for controlling a hose according to claim 3, including a user interface for admitting the operator to control the computer control.

5. The device for controlling a hose according to claim 1, where a control stick is arranged to enable the operator to maneuver the marking device to an intended position for marking of holes or other damages.

6. A device for controlling a hose comprising:
   a hose-bearing drum for bearing the hose and surrounded by protective wall parts, and
   a mechanism, arranged on the inside of the wall parts, for marking of holes or other damages that is capable of being maneuvered automatically or manually via an operator so that at least some protective wall part always protects the operator under pressurization of the hose, the device,
   wherein the device is configured to admit pressurized liquid feeding to be maintained during rotation of the hose bearing drum, and
   wherein the marking device is arranged on a rail inside of the protective walls.

7. The device for controlling of a hose according to claim 6, wherein the rail extends substantially parallel to the rotational axis of the drum but outside of the drum's perimeter, and the position of the marking device is controllable as a runner along the rail.

8. The device for controlling a hose according to claim 7, further comprising an externally arranged mechanical control stick which through a protective housing is connected to the moveable marking device to admit manual or automatic control of the position along the rail and the activation of the marking of holes in the hose.

9. The device for controlling a hose according to claim 6, further including a detection mechanism for automatic detection of holes or other damages.

10. The device for controlling a hose according to claim 9, further comprising a system for controlling the movements of the detection mechanism so that a systematic inspection of substantially the whole hose is admitted, manually or through programming of a movement pattern via driving motors.

11. The device for controlling a hose according to claim 9, comprising a fully automated system for detection and marking of holes that uses input data from the detection mechanism so that marking can be performed in association with a detected hole.

12. A test pressurization system for a fire hose including a device for controlling a hose according to claim 1.

13. A combined system for washing and pressurizing a hose including a device for controlling a hose according to claim 6.

\* \* \* \* \*